United States Patent [19]

Andres et al.

[11] Patent Number: 4,700,974
[45] Date of Patent: Oct. 20, 1987

[54] TRIGGERING ARRANGEMENT FOR PASSENGER RESTRAINT SYSTEMS IN MOTOR VEHICLES

[75] Inventors: Rudolf Andres, Sindelfingen; Heinz Knoll, Stuttgart; Volker Petri, Aidlingen; Harald Pfistner, Stuttgart, all of Fed. Rep. of Germany

[73] Assignee: Daimler-Benz AG, Stuttgart, Fed. Rep. of Germany

[21] Appl. No.: 866,383

[22] Filed: May 23, 1986

[30] Foreign Application Priority Data

May 23, 1985 [DE] Fed. Rep. of Germany ....... 3518502

[51] Int. Cl.$^4$ ............................................. B60R 22/36
[52] U.S. Cl. .................................. 280/806; 280/807; 297/477; 297/480
[58] Field of Search ............... 280/734, 735, 801, 806, 280/807; 297/477, 480

[56] References Cited

U.S. PATENT DOCUMENTS

| 3,935,919 | 2/1976 | Kawamyra et al. | 297/480 |
| 4,163,268 | 7/1979 | Spies et al. | 280/735 |
| 4,164,263 | 8/1979 | Heintz et al. | 297/480 |
| 4,381,829 | 5/1983 | Montaron | 280/735 |
| 4,410,875 | 10/1983 | Spies et al. | 280/735 |

FOREIGN PATENT DOCUMENTS

| 2224197 | 11/1972 | Fed. Rep. of Germany . |
| 2631190 | 1/1978 | Fed. Rep. of Germany . |
| 3328114 | 2/1985 | Fed. Rep. of Germany . |

Primary Examiner—David M. Mitchell
Assistant Examiner—Kenneth R. Rice
Attorney, Agent, or Firm—Barnes & Thornburg

[57] ABSTRACT

A triggering arrangement is described for restraint systems in motor vehicles, in which, in a joint, metallic electromagnetically shielding housing arranged directly at the restraint system, all elements of the triggering arrangement are integrated, including a separate power supply unit. Outside said housing, no electrical leads are required, resulting in an extensive shielding from electromagnetic interference signals and a high saving of costs. Contemplated usage includes with are airbags, belt tighteners, etc., in the case of seats that are firmly anchored to the vehicle, and also in the case of removable seats and seats for children.

9 Claims, 2 Drawing Figures

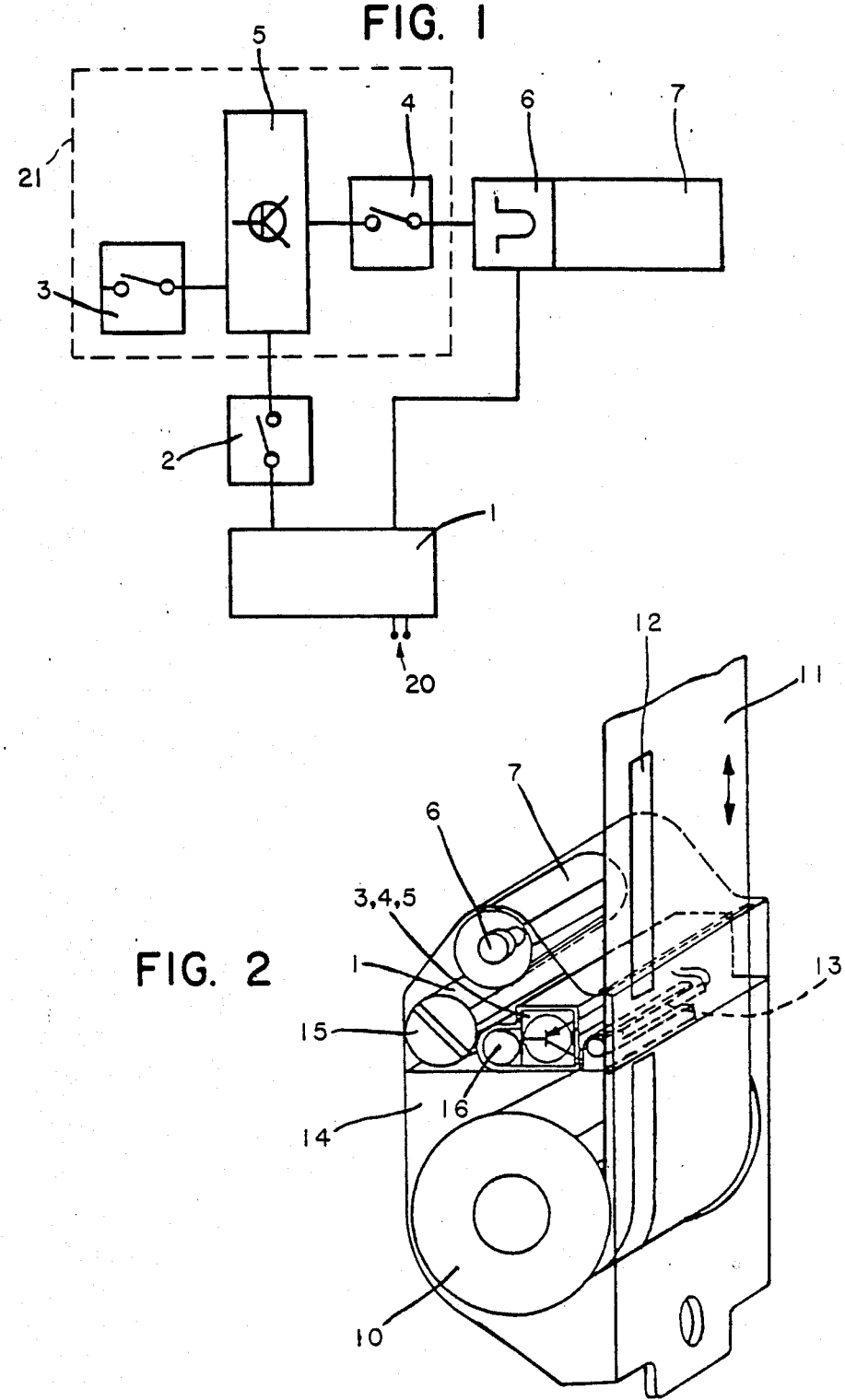

TRIGGERING ARRANGEMENT FOR PASSENGER RESTRAINT SYSTEMS IN MOTOR VEHICLES

BACKGROUND AND SUMMARY OF THE INVENTION

This invention relates to a triggering arrangement for restraint systems in motor vehicles of the type wherein acceleration dependent switches activate an electrical signal which in turn activates a pyrotechnic device to act in the restraint system component. A triggering arrangement of this type is known from German Published Unexamined Application No. 26 31 190.

In the case of the arrangement known on the basis of German Published Unexamined Application No. 26 31 190, an electronic unit is supplied by the electrical system of the motor vehicle and has two sensors and an igniter arranged in a shielded housing at a central point in the motor vehicle. Fast-burning fuse cords lead from the electronic unit to belt-tightening devices at the motor vehicle seats.

From German Published Unexamined Application No. 26 31 190, an acceleration sensor is known that is also supplied by the electrical system of the motor vehicle and that, together with a storage capacitor and an igniter, is housed in a shielded housing.

In the case of these arrangements, the current supply from the electrical system of the motor vehicle is costly and susceptible to disturbances and must be shielded from high-frequency radiation and other interfering signals coming from the outside. The triggering arrangement is connected with the electrical system of the motor vehicle by means of costly cable trees. Unfavorable cable lengths have the effect of an antenna, capture interfering high-frequency signals and require increased protection in order to maintain the operability of the device. Often expensive plug-in systems are required in order to ensure the operability of the triggering system. However, just as costly and susceptible to interferences are the fuse cords that lead from a joint igniter to the individual driving assemblies of the belt tightening devices.

It is therefore an objective of the invention to further develop the known device to the extent that expensive cables and cable trees and costly electrical connections are avoided and that a triggering arrangement is provided that is as cost-effective as possible and is largely unsusceptible to interferences of all types.

According to the invention, this objective is achieved by providing common shield in housing for the pyrotechnic device igniter, and actuating circuit with acceleration dependent switch means.

The special advantage of the invention is the fact that it can be completely assembled outside the vehicle, that no connecting cables are required by means of which interferences can be captured and that no electrical connection is required to the vehicle, also not to the electrical system of the motor vehicle. As a result, the triggering arrangement according to the invention is especially suitable for being installed in child's seats.

Further objects, features, and advantages of the present invention will become more apparent from the following description when taken with the accompanying drawings which show, for purposes of illustration only, an embodiment/several embodiments in accordance with the present invention.

BRIEF DESCRIPTION OF THE DRAWINGS

In the drawing, FIG. 1 is a block diagram of a triggering arrangement for a passenger restraint system constructed in accordance with a preferred embodiment of the invention; and FIG. 2 is a schematic partial view of the system of FIG. 1 in which a belt tightener is integrated into a seat belt.

DETAILED DESCRIPTION OF THE DRAWINGS

A block diagram of the triggering arrangement is shown in FIG. 1. From the energy storage means 1, the power supply is switched via an on-/off-switch 2 through to the 20 electronic evaluating unit 5. For example, a reed-switch may be used for this purpose which is actuated via a magnetic strip woven into the belt strap, which is shown in detail in FIG. 2.

The acceleration-dependent switch 3 senses the acceleration occurring at the occupant protection system and the acceleration-dependent switch 4 is located in the ignition circuit as a safety switch. In the electronic evaluating unit 5, the signals of the switches 2 and 3 are linked, evaluated and led to the igniter 6 via the safety switch 4. The acceleration-dependent switches 3 and 4, along with the evaluating unit 5, in a preferred embodiment, is integrated on a joint electronic chip, schematically indicated by dashed line 21.

The igniter 6 is integrated in the pyrotechnic driving unit 7 so that the ignition can take place almost without any losses.

In an embodiment that is not shown, the ignition energy can be stored relatively slowly via capacitors from a battery and, when needed, can be made available immediately.

In FIG. 2, the described triggering arrangement is shown on an example of a so-called belt tightener in the case of an automatic belt system 10. On the shown belt strap 11, a magnetic strip 12 is arranged at a predetermined point. Said magnetic strip 12, when the belt strap is pulled out (when the belt is put on), switches a reed switch 13 that corresponds to the on-/off-switch 2 of FIG. 1, and thus switches the power supply to the triggering apparatus.

At the housing 14 of the automatic belt system 10, the complete triggering arrangement according to FIG. 1 is mounted as an integrated construction. Next to the already mentioned on-off-switch 13 for the power supply, the battery compartment for the power supply 1 is shown that is closed by means of a lid 15. Also recognizable is the evaluating circuit 5 that is marked by a transistor symbol and that also in an integrated construction contains the acceleration-dependent switches 3 and 4. Also recognizable are the electric igniter 6 and the pyrotechnic driving unit 7 which, in a manner that is not shown, in the case of an accident-caused corresponding deceleration affects the belt system 10 in the sense of a pulling-tight of the strap 11.

After the lid 15 is opened, the battery may be removed or exchanged. Through the open battery compartment, the connections 20 are accessible for an operational checking device of the triggering arrangement that is known per se. Between the power supply means 1 (battery) and the electronic evaluating unit 5, capacitors 16, if present, are arranged as energy storage means.

The triggering arrangement that is located in a electromagnetically shielding metallic housing has no electrical lines that lead to the outside so that the effect of electric or electromagnetic interference signals is largely suppressed. This also results in a significant lowering of costs as compared to previously customary solutions.

As the power supply, conventional long-duration batteries may be used which in favorable cases are operable over the whole service life of the vehicle. However, after certain periods of time, they may be exchanged. Accumulators may also be used that can be recharged. If the batteries are not able to supply the required energy for the ignition, capacitors may be provided as intermediate storage means.

The described triggering arrangement can be used in the case of all acceleration-dependent or deceleration-dependent switches. Examples are airbags, belt tighteners, etc., also in the case of equipment that can be separated from the motor vehicle, such as child's seats, additional seats in multipurpose vehicles, etc. According to the construction, correspondingly suitable switches are used as on-off-switches instead of the solution shown in the embodiment by means of magnetic strips and reed switches.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A triggering arrangement for vehicle passenger restraint systems, comprising:
    acceleration-dependent signal generating means for generating an accident signal in response to vehicle deceleration above a predetermined level,
    pyrotechnic driving unit means operably connectible to actuate a passenger restraint system component,
    power supply means for providing electrical power to the pyrotechnic driving unit means, and
    a single electromagnetically shielding housing accommodating said acceleration dependent signal generating means, said pyrotechnic driving unit means and said power supply means, said housing being disposed directly at the restraint system component to be actuated by the pyrotechnic driving unit means.

2. An arrangement according to claim 1, wherein the acceleration-dependent signal generating means includes at least one acceleration dependent switch and an evaluating unit, the output signal of the evaluating unit being fed to an electrical igniter of the pyrotechnic driving unit means.

3. An arrangement according to claim 2, wherein an acceleration-dependent safety switch is interposed between the evaluating unit and the igniter.

4. An arrangement according to claim 1, wherein the power supply means is an exchangeable long-duration battery.

5. An arrangement according to claim 4, wherein an energy storage means is connected behind the long-duration battery.

6. An arrangement according to claim 5, wherein the energy storage means is a capacitor.

7. An arrangement according to claim 1, wherein said restraint system component is a passenger safety belt.

8. An arrangement according to claim 1, wherein testing and checking connections are provided for an operational checking system that are arranged in the housing of the power supply means and are accessible after removal of a lid and of the power supply unit.

9. An arrangement according to claim 3, wherein the at least one acceleration-dependent switch and the evaluating unit, are integrated on a joint electronic chip.

* * * * *